United States Patent Office 3,770,764
Patented Nov. 6, 1973

3,770,764
2-SUBSTITUTED-4,5-DICYANOIMIDAZOLES
Owen Wright Webster, Wilmington, Del., assignor to E. I. du Pont de Nemours and Company, Wilmington, Del.
No Drawing. Filed May 25, 1971, Ser. No. 146,754
Int. Cl. C07d 49/36
U.S. Cl. 260—309                  10 Claims

ABSTRACT OF THE DISCLOSURE

Cyanogen chloride reacts with diaminomaleonitrile at about ambient temperature to produce 2-amino-4,5-dicyanoimidazole. Reaction of the product with acid and an alkali metal nitrite gives 2-diazo-4,5-dicyano-2H-imidazole, which is useful as an explosive. The 2-amino-4,5-dicyanoimidazole is useful as a chemical intermediate and as a buffering agent.

FIELD OF THE INVENTION

This invention is concerned with 2-substituted-4,5-dicyanoimidazoles and their preparation.

DISCLOSURE OF THE INVENTION

The 2-substituted-4,5-dicyanoimidazoles of this invention are (A) the 2-amino-4,5-dicyanoimidazoles of Formula I,

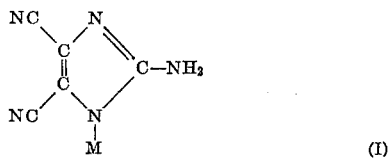

in which M is hydrogen or one equivalent of a metal ion, and (B) 2-diazo-4,5-dicyano-2H-imidazole which may be expressed as the resonance hybrid,

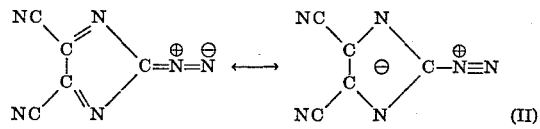

Compounds of Formula I are useful chemical buffers, particularly in water/alcohol systems and 2-diazo-4,5-dicyano-2H-imidazole is a new explosive.

2-amino-4,5-dicyanoimidazole is prepared by the reaction of diaminomaleonitrile with cyanogen chloride. It may be converted to its 2-diazo derivatives by the reaction of nitrous acid. These reactions may be illustrated as follows:

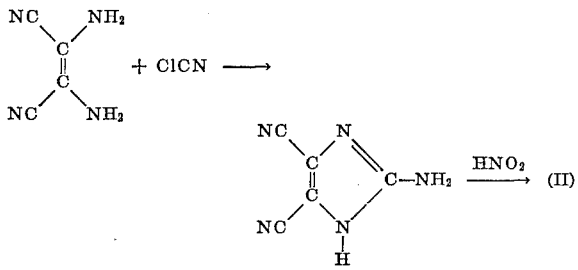

Compounds of Formula I in which M is one equivalent of a metal ion are prepared from 2-amino-4,5-dicyanoimidazole by metathesis.

The reaction of diaminomaleonitrile with cyanogen chloride may be carried out neat. The molecular proportions of the reactants employed may be varied widely, e.g., from 100:1 to 1:100 since any mixture of the two reactants will produce at least some 2-amino-4,5-dicyanoimidazole. However, it is more practical to operate in the range from equimolar proportions up to a 10-molar excess of cyanogen chloride, since excess diaminomaleonitrile is difficult to separate from the product. Equimolar proportions are particularly preferred.

As shown in Example 4, the reaction requires no catalyst. However, to avoid an induction period, it is usually preferred to employ a small amount of a protonic or Lewis acid catalyst to start the reaction. Hydrogen chloride is formed during the reaction and serves to further catalyze it once it is started. Suitable catalysts include $BF_3$, $AlCl_3$, HBr, HCl, $BCl_3$, $H_2SO_4$, and the like.

The use of a liquid reaction medium is not essential. However, it is convenient to employ as a medium any aprotic solvent in which diaminomaleonitrile is at least somewhat soluble and which does not react with cyanogen chloride. Suitable reaction media include acetonitrile, tetrahydrofuran, dioxane, ethyl acetate, ethylene glycol dimethyl ether, and the like.

Time for the reaction may vary from a few minutes (e.g., 5) up to 24 hours or more, depending somewhat on the temperature and the catalyst employed. Temperatures in the range from −30° C. to 100° C. are operable and room temperature is preferred for convenience.

Pressure is not a critical variable in the process and pressures from 0.01 to 100 atmospheres may be employed. Pressures from 1–10 atmospheres are preferred.

2-amino-4,5-dicyanoimidazole may be isolated from the reaction mixture by evaporation of solvent (if any) and washing the solid product with water or with aqueous sodium acetate. It may be purified by dissolving in dilute aqueous sodium bicarbonate, treating with activated carbon, and acidification with hydrochloric acid.

In the compounds of Formula I, M may be hydrogen or one equivalent of any metal ion. By metal is meant an element of atomic number 3–4, 11–13, 19–32, 37–51, 55–84, 87–103, and above. Alkali metals such as Li, Na, K, Rb, and Cs are preferred. The compounds of Formula I in which M is hydrogen may be isolated in the form of its hydrochloride salt.

SPECIFIC EMBODIMENTS OF THE INVENTION

The following examples are provided to illustrate this invention. In these examples parts and percentages are by weight unless otherwise indicated.

Example 1

2-amino-4,5-dicyanoimidazole.—To a mixture of 10 g. of diaminomaleonitrile, 20 ml. of cyanogen chloride and 50 ml. of acetonitrile was added 20 ml. of $BF_3$ etherate at 0° to 10° C. A solution formed after 1.5 hours. The excess cyanogen chloride and part of the acetonitrile were removed under reduced pressure, and the solid hydrochloride of 2-amino-4,5-dicyanoimidazole (2.5 g.) was collected on a filter; IR: 3100, 2200, 1640, 1580, 1100, 835, and 725 cm.$^{-1}$. On treatment with water, the hydrochloride released the parent 2-amino-4,5-dicyanoimidazole (0.78 g.); IR: 3500, 3450, 2750, 2650, 2230, 1650, 1500, 1450, 1300, 1275, 1100, 1040, 800, and 730 cm.$^{-1}$.

Example 2

2-diazo-4,5-dicyano-2H-imidazole.—A small amount of the 2-amino-4,5-dicyanoimidazole from Example 1 was treated with aqueous HCl then $KNO_2$. A precipitate of 2-diazo-4,5-dicyano-2H-imidazole formed; IR: 2230, 1420, 1150 and 735 cm.$^{-1}$. This substance exploded at 148° C.

Example 3

To a mixture of 41.3 g. of cyanogen chloride, 500 ml of acetonitrile and 66.0 g. of diaminomaleonitrile was added 44.5 ml. of $BF_3$ etherate at −10° C. The mixture was stirred at room temperature for 24 hours, was filtered, and the hydrochloride of 2-amino-4,5-dicyanoimidazole which remained on the filter was converted to 24.5 g. of 2-amino-4,5-dicyanoimidazole by treatment with aqueous sodium acetate. The total yield was 69%. A sample for analysis was recrystallized three times from acetonitrile; M.P. 270° C., with decomposition.

*Analysis.*—Calcd. for $C_5H_3N_5$ (percent): C, 45.1; H, 2.3; N, 52.6. Found (percent): C, 45.2; H, 2.3; N, 53.6.

Example 4

A mixture of 10.8 g. of diaminomaleonitrile, 7.5 ml. of cyanogen chloride, and 100 ml. of tetrahydrofuran was stirred for 20 hours. About one hour after mixing the reagents, the temperature rose spontaneously to 64° C. The reaction mixture was then cooled and maintained at room temperature. On addition of 100 ml. of diethyl ether, 15.7 g. of 2-amino-4,5-dicyanoimidazole hydrochloride precipitated.

Example 5

To a mixture of 9.3 g. of cyanogen chloride, 5.5 g. of anhydrous hydrogen chloride, and 100 ml. of tetrahydrofuran at 0° C. was added dropwise, a solution of 16.2 g. of diaminomaleonitrile in 150 ml. of tetrahydrofuran. After 2.5 hours, an exothermic reaction occurred and the temperature rose to 45° C. The reaction mixture was cooled and diluted with ether to precipitate 22.6 g. (89% yield) of 2-amino-4,5-dicyanoimidazole hydrochloride.

Example 6

A solution of 62.0 g. of 2-amino-4,5-dicyanoimidazole and 43.7 g. of sodium bicarbonate in 920 ml. of water was treated with carbon black and filtered to remove impurities. On concentration to 250 ml. under reduced pressure 21.0 g. of the sodium salt of 2-amino-4,5-dicyanoimidazole crystallized. IR: 3400, 3300, 3200, 2220, 1600, 1510, 1320, 1290, 1140, 840, and 760 cm.$^{-1}$. The potassium salt was made by recrystallization of the sodium salt from 10% aqueous potassium chloride.

Example 7

To a solution of 1.00 g. of 2-amino-4,5-dicyanoimidazole in 50 ml. of water and 20 ml. of 6 N HCl at room temperature was added 1.0 g. of potassium nitrite in 10 ml. of water over 0.5 hour. After another hour, 0.85 g. of 2-diazo-4,5-dicyano-2H-imidazole was isolated by filtration. The sample melted at 146° C. with explosion. A small amount on a sintered glass filter funnel also exploded on scratching. For analysis, a sample was recrystallized from acetonitrile.

*Analysis.*—Calcd. for $C_5N_6$ (percent): C, 41.7; N, 58.2. Found (percent): C, 41.6; N, 58.2.

Example 8

A suspension of 3.09 g. of 2-diazo-4,5-dicyano-2H-imidazole in 100 ml. of water was treated with 10 ml. of $H_3PO_2$. After 2 hours most of the solid had dissolved with evolution of nitrogen. The pH was adjusted to 5 with aqueous sodium hydroxide, and the solution was concentrated to about 10 ml. under reduced pressure. On cooling, 1.05 g. of 4,5-dicyanoimidazole crystallized. It was identified by comparison of its infrared spectrum with that of 4,5-dicyanoimidazole prepared from diaminomaleonitrile and methyl orthoformate (D. W. Woodward, U.S. Pat. 2,534,331 (1950)). 4,5-dicyanoimidazole is useful as an intermediate in the preparation of caffeine.

Example 9

A solution of 1.0 g. of 2-amino-4,5-dicyanoimidazole in 50 ml. of water and 50 ml. of methanol had a pH of 6 (Gallard & Schlesinger, Chem. Mfg. Corp., pH paper). On addition of 1, 10, and 20 ml. of 0.1 N sodium hydroxide solution, the pH remained at 6. A control solution of 50 ml. of water and 50 ml. of methanol had a pH of 6. After addition of 1 ml. of 0.1 N NaOH, its pH was 8, and after 10 ml. of 0.1 N NaOH, its pH was 10. The solution of 2-amino-4,5-dicyanoimidazole from above after addition of base was buffered to acid, showing that the metal salts of 2-amino-4,5-dicyanoimidazole are equally useful in preparing buffered systems.

The foregoing detailed description has been given for clarity of understanding only and no unnecessary limitations are to be understood therefrom. The invention is not limited to the exact details shown and described for obvious modifications will be apparent to those skilled in the art.

I claim:

1. A compound having a formula selected from

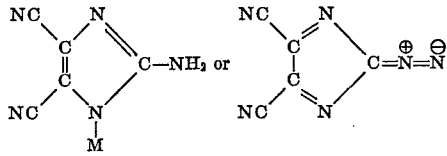

wherein M is hydrogen or one equivalent of a metal ion.

2. The composition of claim 1 wherein the compound has the formula

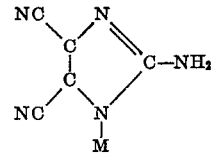

wherein M is hydrogen or an equivalent of a metal ion.

3. The composition of claim 2 wherein M is hydrogen.
4. The composition of claim 2 wherein M is an alkali metal.
5. The composition of claim 4 wherein M is sodium.
6. The composition of claim 4 wherein M is potassium.
7. The composition of claim 1 wherein the compound has the formula

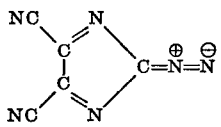

8. A process of making 2-amino-4,5-dicyanoimidazole which comprises contacting and reacting diaminomaleonitrile with cyanogen chloride at a temperature in the range from −30° C. to 100° C.
9. The process of claim 8 wherein the reaction is initiated with a Lewis acid catalyst.
10. The process of claim 9 wherein said catalyst is selected from $BF_3$, $BCl_3$, $AlCl_3$, HBr, HCl or $H_2SO_4$.

References Cited
UNITED STATES PATENTS
2,534,331   12/1950   Woodward _____ 260—309

HARRY I. MOATZ, Examiner

U.S. Cl. X.R.
260—141, 299

UNITED STATES PATENT OFFICE
CERTIFICATE OF CORRECTION

PATENT NO. : 3,770,764
DATED : November 6, 1973
INVENTOR(S) : Owen Wright Webster It is certified that error appears in the above-identified patent and that said Letters Patent are hereby corrected as shown below:

Col. 2, line 64 - "148" should be --146--.

Col. 4, claim 2, line 31 - the bond between the two carbons in the ring should be a double bond.

Signed and sealed this 29th day of April 1975.

(SEAL)
Attest:

RUTH C. MASON
Attesting Officer

C. MARSHALL DANN
Commissioner of Patents
and Trademarks